(12) United States Patent
Warr

(10) Patent No.: US 9,114,782 B2
(45) Date of Patent: Aug. 25, 2015

(54) LEVELING SYSTEM

(71) Applicant: Harnischfeger Technologies, Inc., Wilmington, DE (US)

(72) Inventor: Owen J. Warr, Muskego, WI (US)

(73) Assignee: Harnischfeger Technologies, Inc., Wilmington, DE (US)

( * ) Notice: Subject to any disclaimer, the term of this patent is extended or adjusted under 35 U.S.C. 154(b) by 22 days.

(21) Appl. No.: 13/691,930

(22) Filed: Dec. 3, 2012

(65) Prior Publication Data

US 2013/0140802 A1 Jun. 6, 2013

Related U.S. Application Data

(60) Provisional application No. 61/565,800, filed on Dec. 1, 2011.

(51) Int. Cl.
*B60S 9/10* (2006.01)
*E21B 7/02* (2006.01)
*E21B 15/00* (2006.01)

(52) U.S. Cl.
CPC . *B60S 9/10* (2013.01); *E21B 7/024* (2013.01); *E21B 15/003* (2013.01)

(58) Field of Classification Search
CPC .............. E02F 9/085; B60S 9/10; B60S 9/12; E21B 7/024; B66F 3/44; B66F 3/25; B66C 23/80
USPC ................ 280/766.1; 254/423; 137/269, 884; 248/188.5
See application file for complete search history.

(56) References Cited

U.S. PATENT DOCUMENTS

| | | | | | |
|---|---|---|---|---|---|
| 2,443,209 | A | * | 6/1948 | Thornburg | 254/423 |
| 3,181,630 | A | | 5/1965 | Coburn | |
| 3,625,483 | A | * | 12/1971 | Stoner | 254/423 |
| 4,109,733 | A | * | 8/1978 | Dummer | 173/4 |
| 4,437,385 | A | * | 3/1984 | Kramer et al. | 91/361 |
| 4,524,836 | A | * | 6/1985 | Pehrson | 172/4.5 |
| 4,615,491 | A | | 10/1986 | Batch et al. | |
| 4,872,275 | A | | 10/1989 | Beckett et al. | |
| 6,050,573 | A | * | 4/2000 | Kunz | 280/6.153 |
| 6,523,570 | B2 | * | 2/2003 | Weiss et al. | 137/627.5 |
| 7,243,907 | B2 | * | 7/2007 | Singh et al. | 254/423 |
| 8,177,193 | B2 | | 5/2012 | Kooima et al. | |
| 2011/0024706 | A1 | | 2/2011 | Schwindaman et al. | |
| 2011/0062399 | A1 | | 3/2011 | Kooima et al. | |

FOREIGN PATENT DOCUMENTS

GB        1432094        4/1976

OTHER PUBLICATIONS

First Office Action from the Australian Intellectual Property Office for Application No. 2012258501 dated Jun. 13, 2014 (8 pages).

* cited by examiner

*Primary Examiner* — Brodie Follman
*Assistant Examiner* — Brian Cassidy
(74) *Attorney, Agent, or Firm* — Michael Best & Friedrich LLP

(57) ABSTRACT

A leveling system for supporting a drill assembly includes at least one hydraulic actuator and a manifold coupled to the actuator. The hydraulic actuator supports the cab relative to a support surface, and includes a first end coupled to the cab and a second end that is extendable away from the first end. The manifold is coupled to the actuator and includes a directional flow control valve, a regenerative flow valve, and at least one counterbalance valve for controlling the extension of the actuator. The counterbalance valve is in direct fluid communication with the actuator.

16 Claims, 7 Drawing Sheets

LEVELING SYSTEM

CROSS-REFERENCE TO RELATED APPLICATIONS

This application claims the benefit of U.S. Provisional Patent Application No. 61/565,800, filed Dec. 1, 2011, the entire contents of which are incorporated herein by reference.

BACKGROUND OF THE INVENTION

The present invention relates to the field of blasthole drills. Specifically, the present invention discloses a leveling system for an operator cab and complete drill assembly.

Conventional drills often include a main platform for supporting an operator cab and the drilling mast/system; a leveling mechanism is then used for supporting the platform relative to the ground. The leveling mechanism may include hydraulic jacks that engage the ground. The fluid flow to each of the jacks is centrally controlled by a controller and valve manifold that are in fluid communication with each jack through a series of hoses. The hose connections can be cumbersome in part because each jack is subject to complex control inputs during operation. In addition, the hoses create pressure losses between the valve manifold and the individual jacks, causing the operation of the jacks to lag behind the controls. This causes the system to exhibit hysteresis and impairs the responsiveness of the leveling system.

SUMMARY OF THE INVENTION

In one embodiment, the invention provides a leveling system for supporting an operator cab. The leveling system includes at least one hydraulic actuator and a manifold coupled to the actuator. The hydraulic actuator supports the cab relative to a support surface, and includes a first end coupled to the cab and a second end that is extendable away from the first end. The manifold is coupled to the actuator and includes a directional flow control valve, a regenerative flow valve, and at least one counterbalance valve for controlling the extension of the actuator. The counterbalance valve is in direct fluid communication with the actuator.

In another embodiment, the invention provides a drill including a mainframe supporting an operator cab, a mast supporting a drill, and a plurality of hydraulic jacks supporting the mainframe and the mast relative to a support surface. Each jack includes an actuator extendable away from the mainframe and a valve manifold. The valve manifold is coupled to the actuator and includes a directional flow control valve, a regenerative flow valve, and a pair of counterbalance valves for controlling the extension of the actuator. The counterbalance valves are in direct fluid communication with the actuator.

In yet another embodiment, the invention provides a hydraulic jack for an excavation machine. The jack includes a shell, an actuator, and a valve manifold coupled to the shell. The shell includes a first end and a second end having an opening. The actuator includes a cylinder, a rod, a piston, a first conduit, and a second conduit. The cylinder is positioned at least partially within the shell and is moveable relative to the shell. The cylinder includes a first end and a second end for engaging a support surface. The rod is positioned at least partially within the cylinder and includes a first end coupled to the first end of the shell and a second end. The piston is coupled to the second end of the rod and divides the cylinder into a base side chamber and a rod side chamber. The first conduit extends at least partially through the rod and is in fluid communication with the rod side chamber. The second conduit extends through the rod and is in fluid communication with the base side chamber. The valve manifold is coupled to the shell and includes at least one directional flow control valve, at least one regenerative flow valve, a first counterbalance valve in direct fluid communication with the first conduit, and a second counterbalance valve in direct fluid communication with the second conduit.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
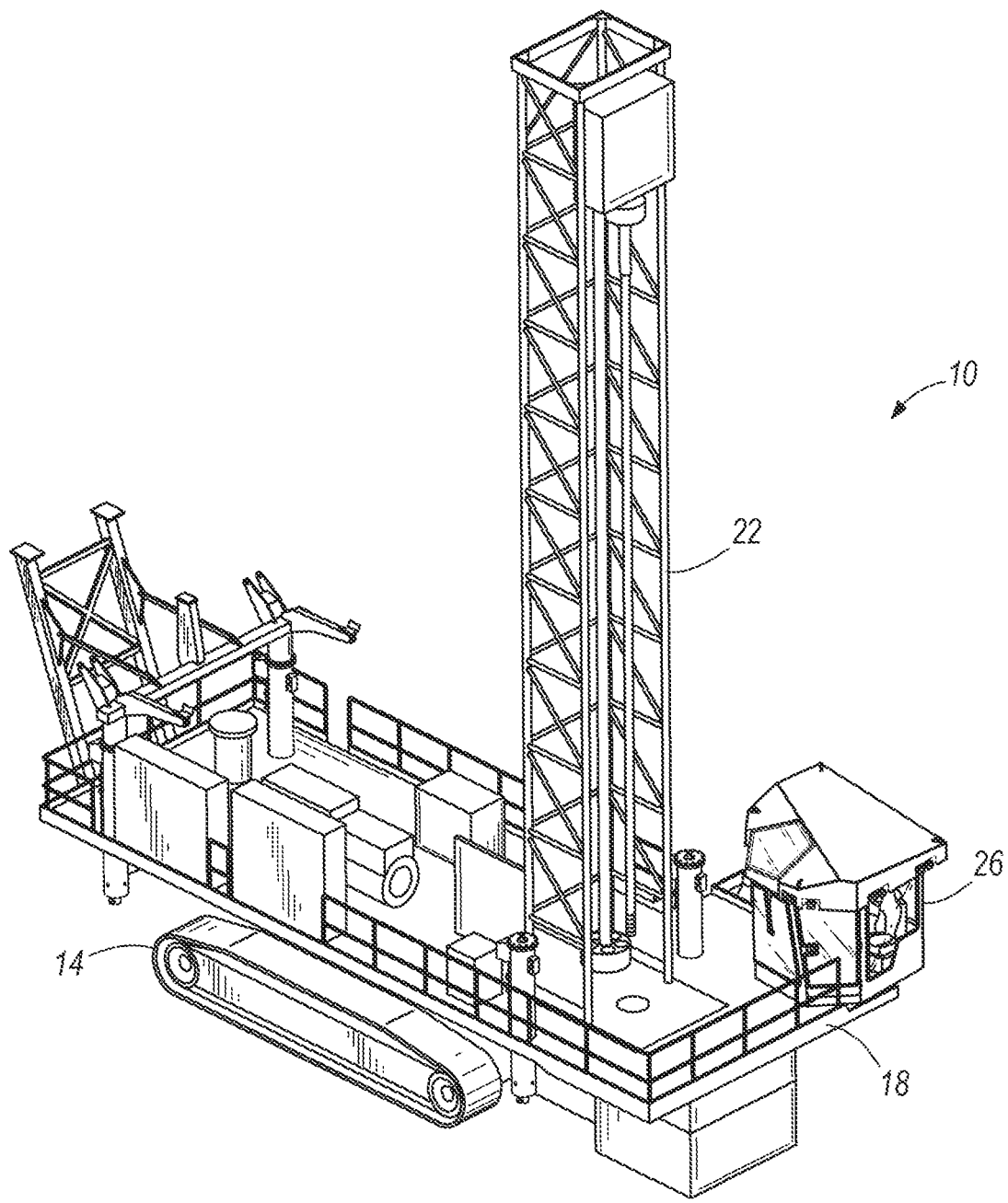
FIG. 1 is a perspective view of a blasthole drill.
Figure 2:
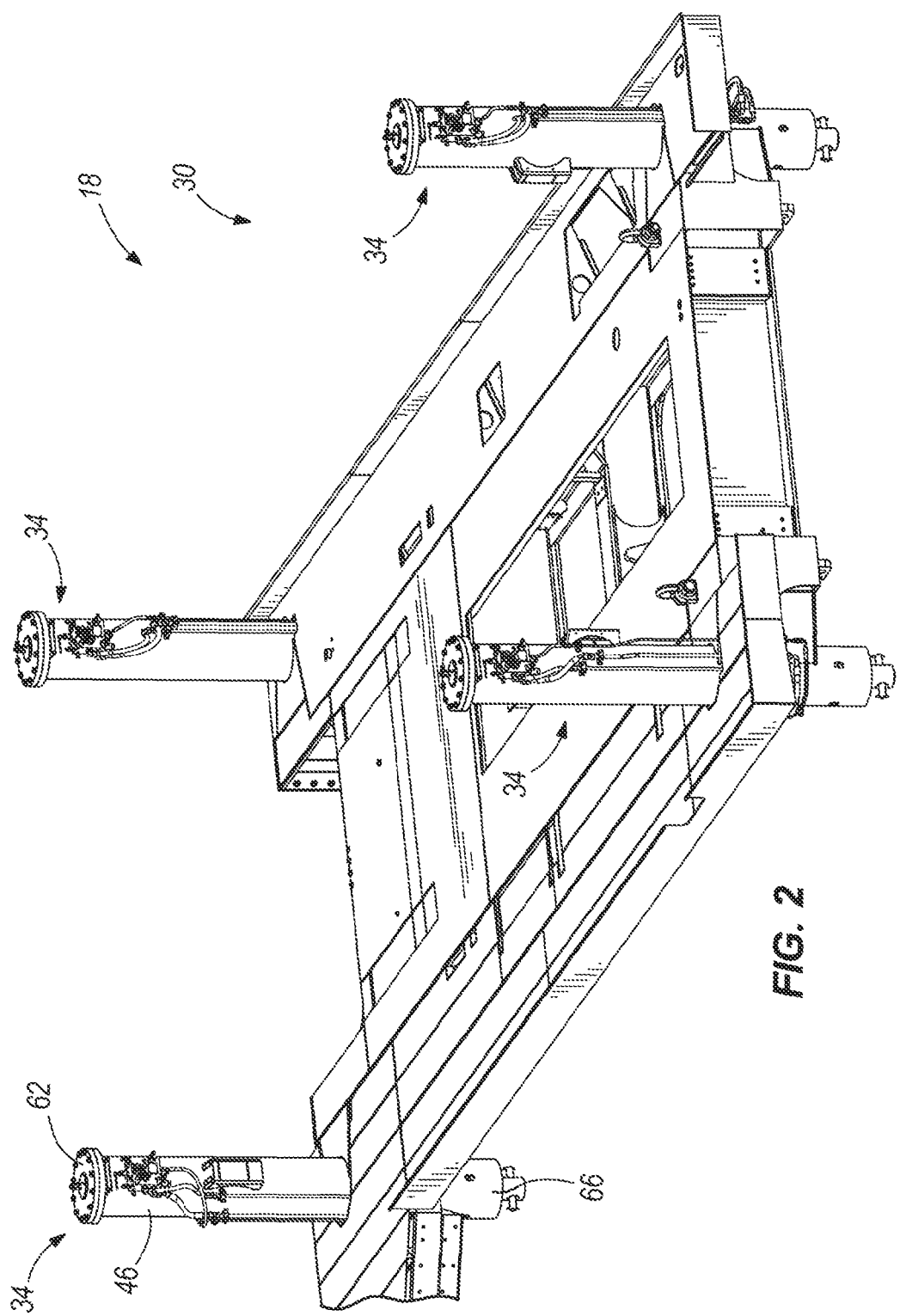
FIG. 2 is a perspective view of a mainframe of the blasthole drill of FIG. 1 without associated equipment mounted thereon, but illustrating the location of leveling jacks on the mainframe.
Figure 3:
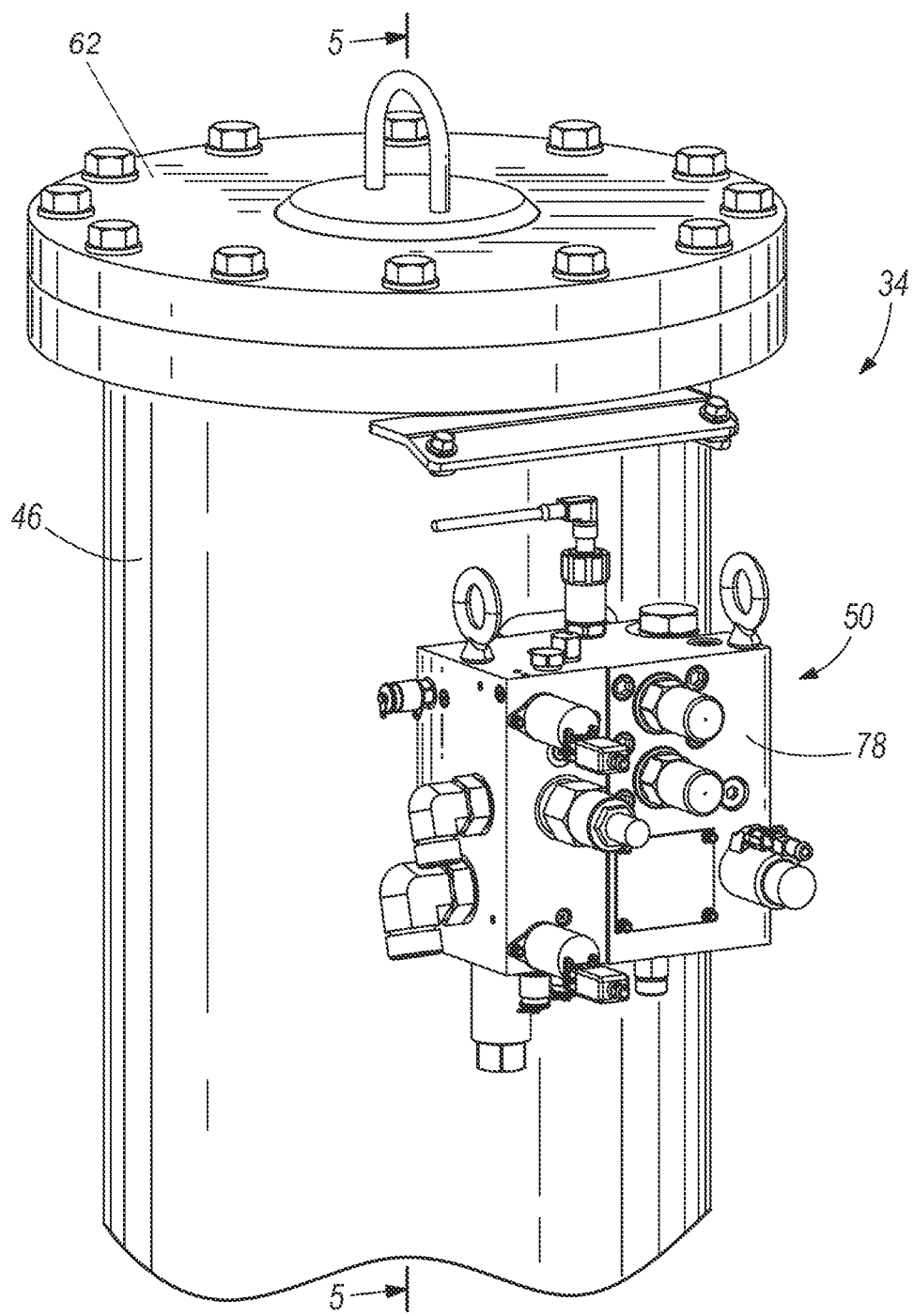
FIG. 3 is a partial perspective view of a jack.
Figure 4:
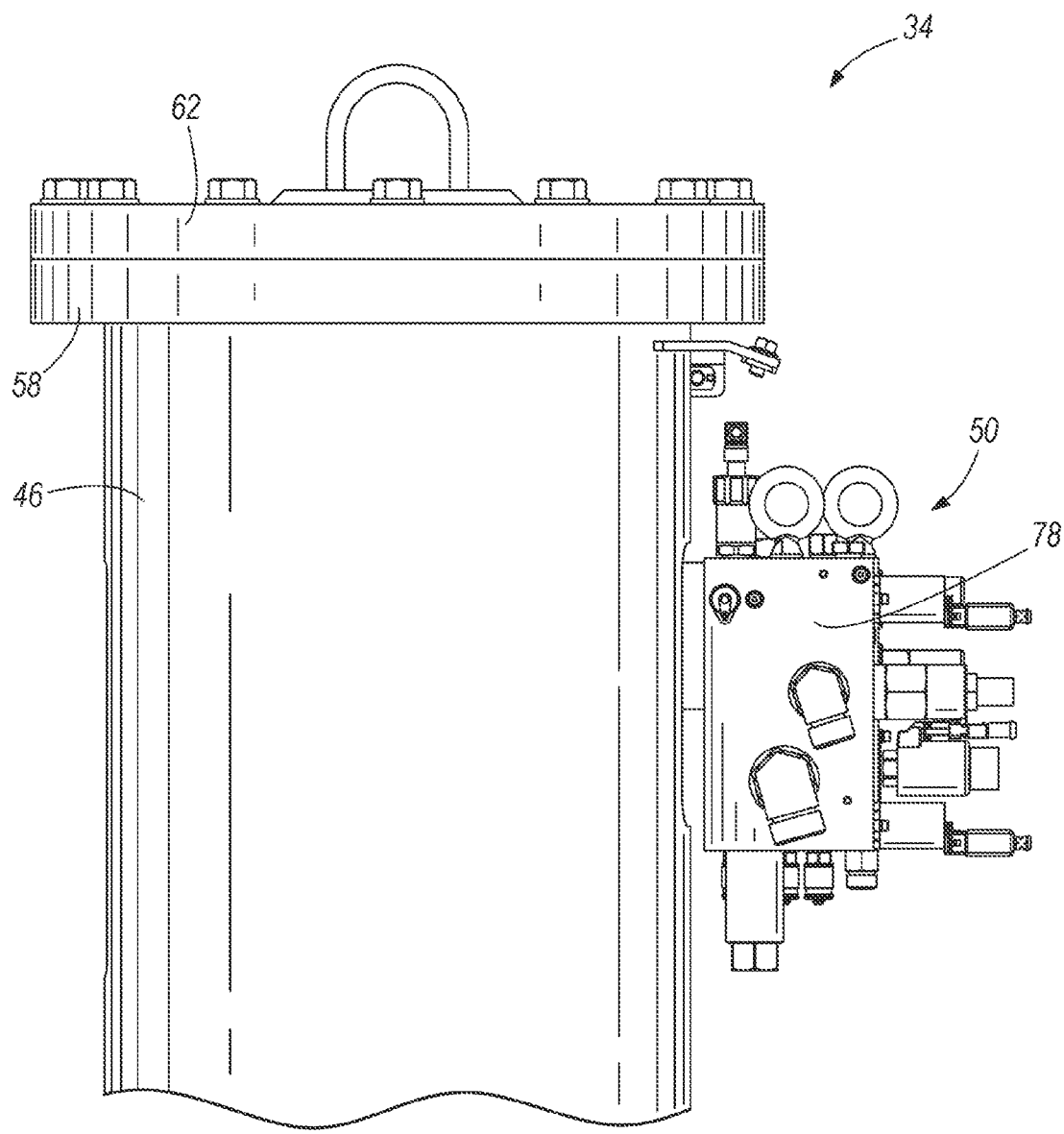
FIG. 4 is a side view of the jack of FIG. 3.

As shown in FIG. 1, a blasthole drill 10 includes a base or lower works 14 for supporting and moving the drill 10 over a support surface, a platform or mainframe 18, a mast 22 for supporting a drill, an operator cab 26, and a leveling system 30 (FIG. 2) for supporting the mainframe 18 relative to the support surface. The mainframe 18 is coupled to the lower works 14 and supports the mast 22 and the cab 26. In the illustrated embodiment, the leveling system 30 includes four leveling jacks 34. In other embodiments, the leveling system may include fewer or more jacks 34.

Figure 5:
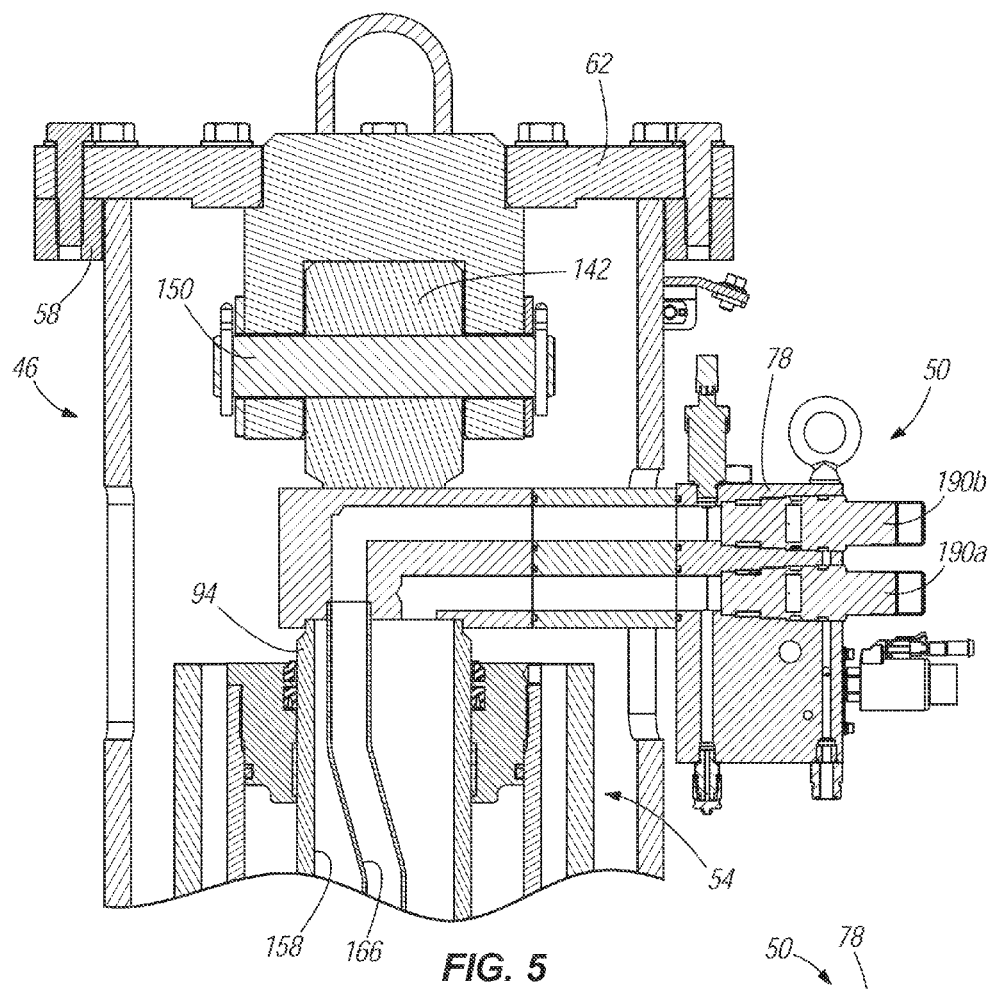
FIG. 5 is a cross sectional view of the jack of FIG. 3 taken along line 5-5.
Figure 6:
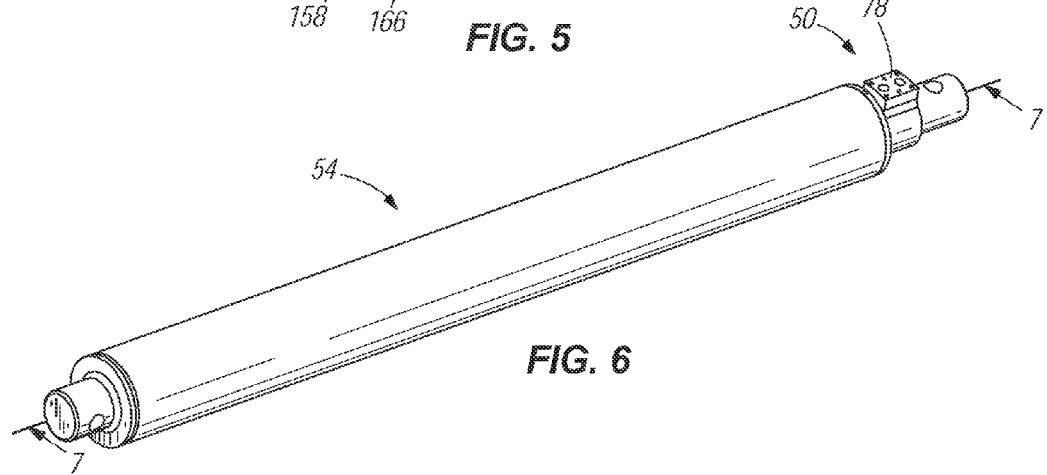
FIG. 6 is a perspective view of a jack cylinder.

As best shown in FIGS. 3-6, each jack 34 includes a shell 46, an electro-hydraulic control 50, and an actuator or leveling cylinder 54 (FIGS. 5 and 6). The shell 46 includes a first end 58 coupled to a flange cover 62, and a second end 66 (FIG. 2) that is open. The electro-hydraulic control 50 is positioned adjacent the shell 46 and is in direct fluid communication with the leveling cylinder 54. The electro-hydraulic control 50 includes a pressure sensor 74 (FIG. 9) and a valve manifold 78, and is described in greater detail below. The leveling cylinder 54 (FIGS. 5 and 6) is positioned within the shell 46 and extends outwardly from the second end 66 of the shell 46.

Figure 7:
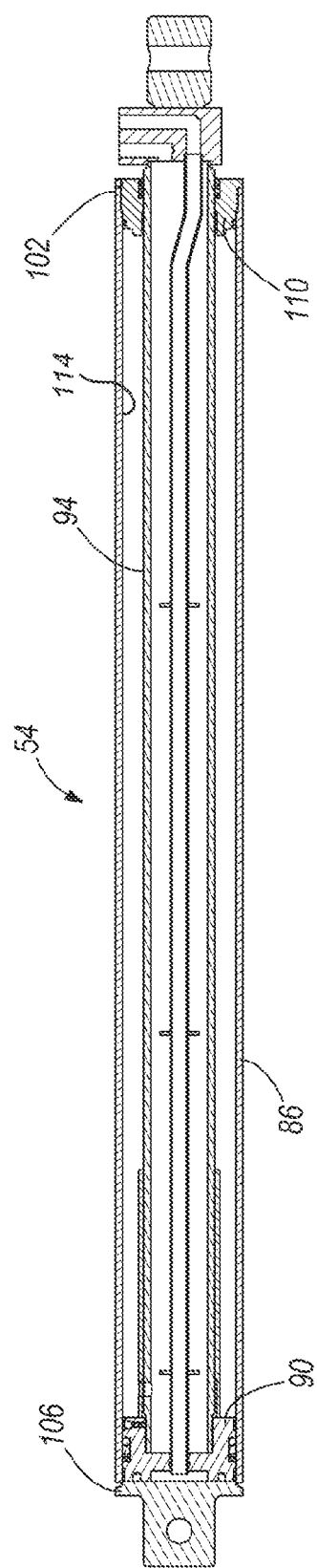
FIG. 7 is a cross sectional view of the jack cylinder of FIG. 6.

As shown in FIG. 7, the leveling cylinder 54 includes a barrel 86, a piston 90 positioned within the barrel 86, and a rod 94 positioned substantially within the barrel 86. The barrel 86 is moveable relative to the rod 94 and the piston 90. The barrel 86 includes a first end 102 and a second end 106.

The first end 102 of the barrel 86 includes a rod seal 110 extending circumferentially around an inside surface 114 of the barrel 86. The rod seal 110 engages the rod 94 and is moveable relative to the rod 94. The second end 106 of the barrel 86 may be coupled to a support member (not shown) for engaging the ground or support surface.

Figure 8:
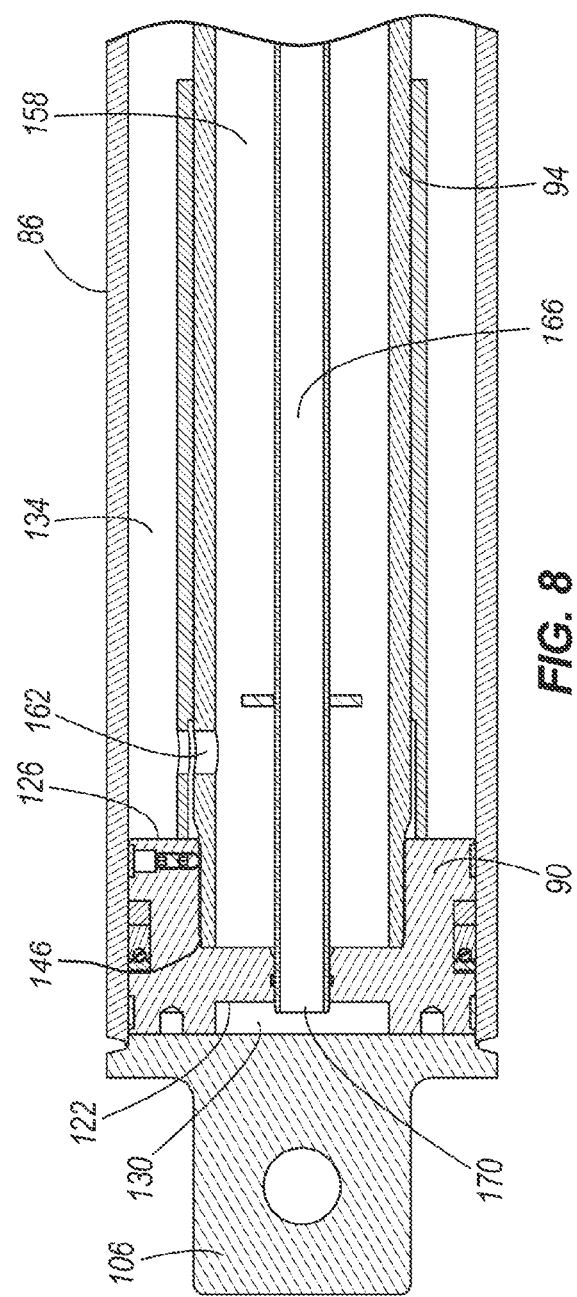
FIG. 8 is an enlarged cross sectional view of the jack cylinder of FIG. 6.

Referring to FIG. 8, the piston 90 includes a base side 122 and a rod side 126. The piston 90 divides the cylinder 54 into a base side chamber 130 and a rod side chamber 134. The base side chamber 130 is formed by the interior volume of the barrel 86 extending between the second end 106 of the barrel 86 and the base side 122 of the piston 90. The rod side chamber 134 is defined by the interior volume of the barrel 86 located between the barrel 86 and the rod 94 and extends from the rod side 126 of the piston 90 to the rod seal 110.

Referring to FIGS. 5 and 8, the rod 94 includes a first end 142 (FIG. 5) coupled to the shell 46 and a second end 146 (FIG. 8) coupled to the rod side 126 of the piston 90. In the illustrated embodiment, the first end 142 of the rod 94 is coupled to the shell 46 by a tie rod 150 (FIG. 5). The rod 94 includes a first conduit 158, a first port 162 (FIG. 8), a second conduit 166, and a second port 170 (FIG. 8). The first conduit 158 is located within the rod 94 and is in direct fluid communication with the valve manifold 78 (FIG. 5). The term "direct fluid communication" refers to the fact that the valve manifold 78 directly interfaces with the conduit 158 without requiring hoses or other intermediate connections. The second conduit 166 is in direct fluid communication with the valve manifold 78 and extends through the rod 94. In particular, the first conduit 158 and the second conduit 166 are each in direct fluid communication with a counterbalance valve 190a, 190b (FIG. 5), as described in more detail below. As shown in FIG. 8, the first port 162 is positioned on the rod 94 and provides fluid communication between the first conduit 158 and the rod side chamber 134. The second conduit 166 is schematically parallel to the first conduit 158, such that the first conduit 158 and the second conduit 166 are not in communication with one another. The second port 170 is positioned on the base side 122 of the piston 90 and provides fluid communication between the second conduit 166 and the base side chamber 130.

When fluid is supplied to the base side chamber 130 via the second conduit 166 and drained from the rod side chamber 134 via the first conduit 158, the second end 106 of the barrel 86 moves away from the piston 90 while the first end 102 of the barrel 86 moves toward the piston 90 to extend the cylinder 54. Similarly, when fluid is supplied to the rod side chamber 134 via the first conduit 158 and drained from the base side chamber 130 via the second conduit 166, the second end 106 of the barrel 86 moves away from the piston 90 to retract the cylinder 54.

Figure 9:
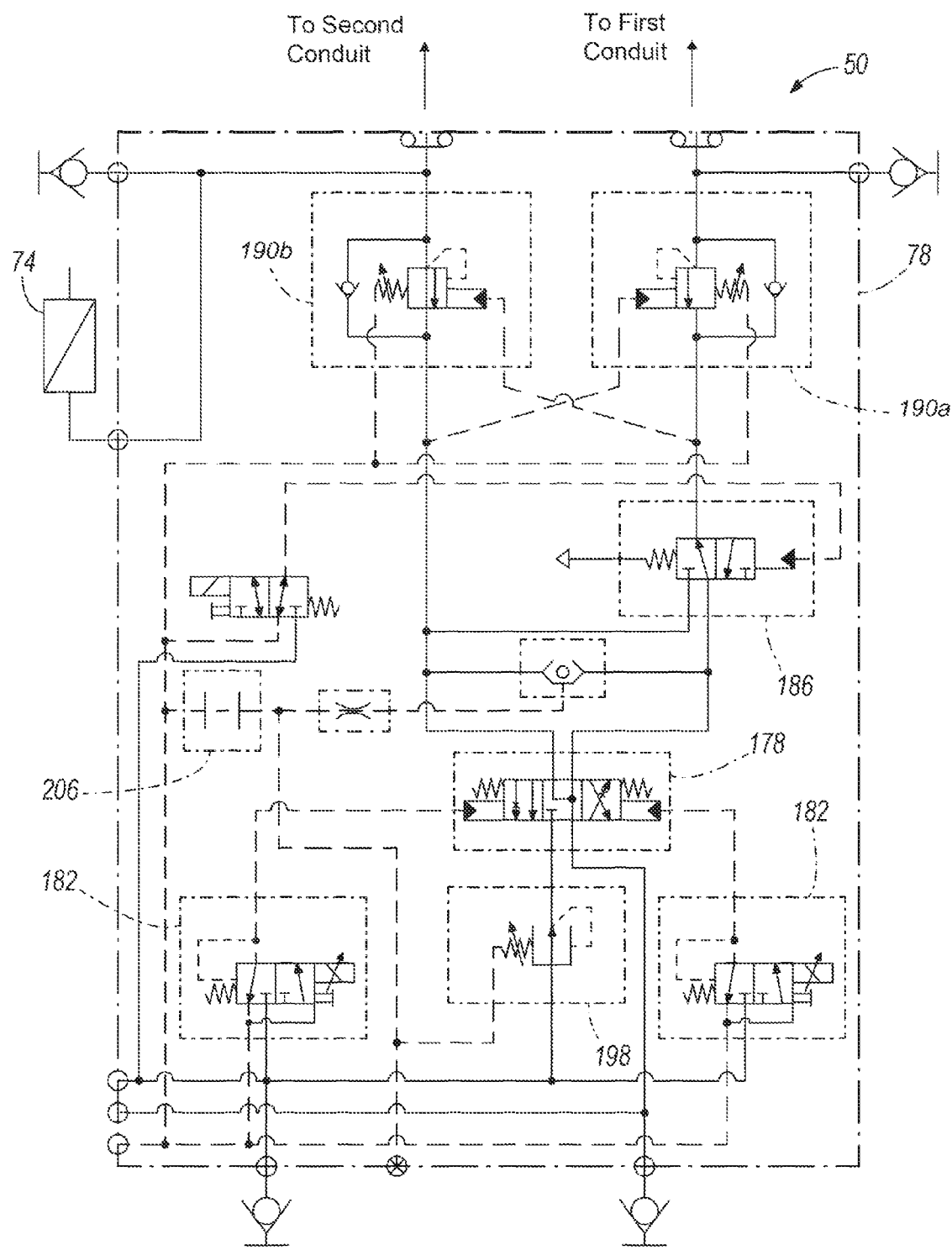
FIG. 9 is a schematic of a hydraulic control system.

The electro-hydraulic control 50 is shown schematically in FIG. 9. The valve manifold 78 includes a pressure-compensated proportional flow control valve 178, a pair of pilot valves 182, a regenerative flow valve 186, and a pair of counterbalance valves 190. The flow control valve 178 is coupled to a pressure compensator valve 198. One of the pilot valves 182 moves the flow control valve 186 to an "extend" phase to extend the leveling cylinder 54, while the other pilot valve 182 moves the flow control valve to a "retract" phase. The regenerative flow valve 186 is operated by the pilot valves 182 and includes a cavity 206 for providing a pressure limitation on the regenerative fluid flow. The counterbalance valves 190 are also operated by the pilot valves 182 and sense a sudden pressure change in either the base side chamber 130 or the rod side chamber 134. The electro-hydraulic controller 50 obtains pressure data for the cylinder 54 from the pressure sensor 74.

During operation, the operator activates one of the pilot valves 182 to extend or retract each jack 34 to level the mainframe 18. The operator may actuate all of the jacks 34 simultaneously or individually. When the pilot valve 182 associated with the extend phase is actuated, for instance, the flow control valve 178 is moved such that fluid is supplied through the second counterbalance valve 190b to the second conduit 166, and then to the base side chamber 130. The counterbalance valves 190a, 190b are operated by pilot pressure, and the counterbalance valves 190a, 190b block fluid flow to both chambers 130, 134 of the cylinder 54 if the pilot flow to either counterbalance valve 190 is interrupted. The counterbalance valves 190a, 190b control flow to the cylinder 54 and also lock the cylinder in case of a sudden drop in fluid flow or pressure. Therefore, the counterbalance valves 190a, 190b provide an additional measure of safety during operation of the drill 10.

If the counterbalance valves 190 permit fluid flow in both directions, the regenerative flow valve 186 is actuated to allow some of the fluid that is pushed out of the rod side chamber 134 to flow into the base side chamber 130, providing better response time for extending the cylinder 54. The regenerative fluid flow may be limited by a maximum pressure.

The leveling system 30 include multiple jacks 34 for supporting the mainframe 18, and each jack 34 includes an individual valve manifold 78 directly coupled to the jack 34 to provide direct fluid communication between the counterbalance valves 190a, 190b and the cylinder 54. The flow control valve 178 is housed within the same valve manifold 78 as the regenerative flow valve 186 and the counterbalance valves 190a, 190b. The electro-hydraulic control 50 actuates the valves remotely. These features eliminate the need for hose connections between each valve and the cylinder 54, thereby significantly reducing the hysteresis in the system and improving the response time of the controller 50.

Thus, the invention provides, among other things, a leveling system. Various features and advantages of the invention are set forth in the following claims.

What is claimed is:

1. A leveling system for supporting a drill assembly, the leveling system comprising:
   at least one hydraulic actuator supporting a cab relative to a support surface, the actuator including a first end coupled to the cab and a second end that is extendable away from the first end, the actuator further including a first fluid passageway and a second fluid passageway for providing fluid flow to extend and retract the second end; and
   a manifold directly connected to the actuator, the manifold including a directional flow control valve, a regenerative flow valve, and at least one counterbalance valve for controlling the extension of the actuator, the at least one counterbalance valve being in direct fluid communication with at least one of the first fluid passageway and the second fluid passageway,
   further comprising a shell including a first end and a second end having an opening,
   wherein the hydraulic actuator includes
      a barrel positioned at least partially within the shell and moveable relative to the shell, the barrel including a first end and a second end for engaging the support surface,
      a rod positioned at least partially within the barrel, the rod including a first end coupled to the first end of the shell and a second end, and a piston coupled to the second end of the rod, the piston dividing the barrel into a base side chamber and a rod side chamber, and wherein the first fluid passageway extends at least partially through the rod and is in fluid communication with the rod side chamber, and the second fluid passageway extends through the rod and is in fluid communication with the base side chamber.

2. The leveling system of claim 1, wherein the directional flow control valve is a pressure compensated proportional flow control valve.

3. The leveling system of claim 1, wherein the counterbalance valve blocks fluid flow to the rod side chamber and the base side chamber if fluid flow to the counterbalance valve is interrupted.

4. The leveling system of claim 1, wherein the regenerative flow valve is actuated to permit fluid flow from the rod side chamber to the base side chamber, and wherein the fluid flow is not permitted once the pressure in the base side chamber reaches a predetermined level.

5. The leveling system of claim 1, wherein the regenerative flow valve and the directional flow control valve are in direct fluid communication with the actuator.

6. A drill comprising:
a mainframe supporting an operator cab;
a mast supporting a drill; and
a plurality of hydraulic jacks supporting the mainframe and the mast relative to a support surface, each jack including an actuator extendable away from the mainframe and a valve manifold, the valve manifold directly connected to the actuator and including a directional flow control valve, a regenerative flow valve, and a pair of counterbalance valves for controlling the extension of the actuator, the counterbalance valves being in direct fluid communication with the actuator,
further comprising a shell including a first end and a second end having an opening,
wherein the hydraulic actuator includes
a barrel positioned at least partially within the shell and moveable relative to the shell, the barrel including a first end and a second end for engaging the support surface,
a rod positioned at least partially within the barrel, the rod including a first end coupled to the first end of the shell and a second end, and
a piston coupled to the second end of the rod, the piston dividing the barrel into a base side chamber and a rod side chamber,
wherein the rod includes a first conduit and a second conduit, the first conduit extending at least partially through the rod and in fluid communication with the rod side chamber, the second conduit extending through the rod and in fluid communication with the base side chamber.

7. The drill of claim 6, wherein the directional flow control valve is a pressure compensated proportional flow control valve.

8. The drill of claim 6, wherein one of the counterbalance valves blocks fluid flow to the rod side chamber and the other counterbalance valve blocks fluid flow to the base side chamber if fluid flow to either counterbalance valve is interrupted.

9. The drill of claim 6, wherein the regenerative flow valve is actuated to permit fluid flow from the rod side chamber to the base side chamber, and wherein the fluid flow is not permitted once the pressure in the base side chamber reaches a predetermined level.

10. The drill of claim 6, wherein the regenerative flow valve and the directional flow control valve are in direct fluid communication with the actuator.

11. The drill of claim 6, wherein the plurality of hydraulic jacks includes at least three hydraulic jacks.

12. A hydraulic jack for an excavation machine, the jack comprising:
a shell including a first end and a second end having an opening;
an actuator including
a barrel positioned at least partially within the shell and moveable relative to the shell, the barrel including a first end and a second end for engaging a support surface;
a rod positioned at least partially within the barrel, the rod including a first end coupled to the first end of the shell and a second end,
a piston coupled to the second end of the rod, the piston dividing the barrel into a base side chamber and a rod side chamber,
a first conduit extending at least partially through the rod and being in fluid communication with the rod side chamber, and
a second conduit extending through the rod and being in fluid communication with the base side chamber; and
a valve manifold directly connected to the shell and including at least one directional flow control valve, at least one regenerative flow valve, a first counterbalance valve in direct fluid communication with the first conduit, and a second counterbalance valve in direct fluid communication with the second conduit.

13. The hydraulic jack of claim 12, wherein the directional flow control valve is a pressure-compensated proportional flow control valve.

14. The hydraulic jack of claim 12, wherein the first counterbalance valve blocks fluid flow to the rod side chamber if fluid flow to the first counterbalance valve is interrupted.

15. The hydraulic jack of claim 12, wherein the at least one regenerative flow valve is actuated to permit fluid flow from the rod side chamber to the base side chamber to assist in extending the barrel, and wherein the fluid flow is not permitted once the pressure in the base side chamber reaches a predetermined level.

16. The hydraulic jack of claim 12, wherein the at least one regenerative flow valve and the at least one directional flow control valve are in direct fluid communication with one of the first conduit and the second conduit.

* * * * *